(12) United States Patent
Marconi

(10) Patent No.: US 12,080,920 B1
(45) Date of Patent: Sep. 3, 2024

(54) AUTOMATIC BATTERY WATERING SYSTEM

(71) Applicant: David C. Marconi, Fort Lauderdale, FL (US)

(72) Inventor: David C. Marconi, Fort Lauderdale, FL (US)

( * ) Notice: Subject to any disclaimer, the term of this patent is extended or adjusted under 35 U.S.C. 154(b) by 0 days.

(21) Appl. No.: 18/532,831

(22) Filed: Dec. 7, 2023

(51) Int. Cl.
| | |
|---|---|
| *H01M 10/00* | (2006.01) |
| *H01M 50/618* | (2021.01) |
| *H01M 50/655* | (2021.01) |
| *H01M 50/673* | (2021.01) |

(52) U.S. Cl.
CPC ....... *H01M 50/618* (2021.01); *H01M 50/655* (2021.01); *H01M 50/673* (2021.01)

(58) Field of Classification Search
CPC ................ H01M 10/48; H01M 10/42; H01M 8/004291; H01M 10/4242; H01M 10/44; H01M 50/618; F16L 37/092
See application file for complete search history.

(56) References Cited

U.S. PATENT DOCUMENTS

| 4,386,141 A | 5/1983 | Weidner et al. |
| 5,862,830 A | 1/1999 | Landau |
| 2003/0102029 A1 | 6/2003 | Crook et al. |
| 2014/0227615 A1* | 8/2014 | Friesen ............ H01M 8/04171 429/50 |

FOREIGN PATENT DOCUMENTS

EP      2369657      12/2014

* cited by examiner

*Primary Examiner* — Cynthia H Kelly
*Assistant Examiner* — Monique M Wills
(74) *Attorney, Agent, or Firm* — The Concept Law Group, PA; Scott D. Smiley; Scott M. Garrett

(57) ABSTRACT

An automatic and passive battery fluid maintenance system maintains the fluid levels in a battery system by replenishing water as the water is lost from the battery. A reservoir is used to contain a volume of fluid and is mounted above the batteries. Fluid from the reservoir flows into a distribution manifold through a flow regulator. From the manifold the fluid is distributed a vent plug at each battery. The vent plugs are configured to control create a backpressure in the fluid line when the battery fluid level is at an optimum level. As a result of the backpressure, fluid does not flow into the battery through the vent plug. When the fluid in the battery drops below the optimum level, the backpressure is reduced, allowing water to flow until the fluid level of the battery again is at the optimum level.

18 Claims, 14 Drawing Sheets

AUTOMATIC BATTERY WATERING SYSTEM

FIELD OF THE INVENTION

The present invention relates generally to battery systems that require replenishment of a fluid, and, more particularly, relates to a continuous fluid replenishment system that maintains battery fluid levels while the battery system is in use and while it is being recharged, where the fluid replenishment system travels with the battery and does not rely on float valves or other mechanical operation to provide fluid to the battery.

BACKGROUND OF THE INVENTION

Although electric vehicles for personal transportation are becoming increasingly popular, industrial vehicles have long been operated by electric battery systems. In particular, many types of fork lift vehicles are battery operated. Unlike electric vehicles made for personal transportation, which use lithium ion-based battery systems, many industrial vehicles use lead acid battery systems. There are a variety of reasons for this, not the least of which is that lead acid battery systems are substantially less expensive than newer battery systems. Industrial operations have an infrastructure based around lead acid battery systems, including charging and maintenance, which would need to be replaced in order to change over to a different battery system, which represents a substantial cost. In addition, it is known that a lithium ion battery system that provides similar energy storage capability as a lead acid battery system will be much lighter than the lead acid battery, and is some applications this is not a benefit. For example, a forklift depends on having a certain amount of weight to counter weight the load it is lifting. As such, lead acid battery systems are likely to persist in certain applications.

Lead acid batteries use aqueous cells and during use they can lose water. Batteries in the center of a battery array, for example, tend to get hotter than batteries on the outside of an array, and lose more water than those on the outside. Since the loss of water can impact the service life of a battery, it is necessary to ensure that the water is replenished before the fluid loss can result in damage to a battery. Typically, replenishment is done when a battery array is removed from a vehicle for charging. A technician will inspect each battery cell and determine if water is needed, and replenish those cells that need replenishing. This is a tedious task that is prone to error.

There have been attempts made to create self-watering battery systems, where a supply of water is provided, and a valve in each battery cell control the flow of water into the battery. In some self-watering systems, the battery cells are connected in a daisy chain where the first battery fluid level controls whether fluid will flow into the subsequently connected battery cells. These systems assume every battery cell in an array will lose the same amount of water, but in high-use systems this is not the case, and as a result, some battery cells will be properly replenished while subsequently connected battery cells continue to lose water because of higher operating temperatures in those particular battery cells. On the other hand, connecting the higher loss battery cells first in line can result in over-watering of subsequent battery cells. Other systems have sought to use float valves on each battery cell to control fluid flow into each battery cell. However, those systems have been found to be prone to error due to vibration, allowing excess water to flow past the float mechanism.

Therefore, a need exists to overcome the problems with the prior art as discussed above.

SUMMARY OF THE INVENTION

In accordance with some embodiments of the inventive disclosure, there is provided an automatic watering system for a battery or battery assembly that includes a fluid reservoir that has an outlet. There is also a flow regulator that has an inlet and an outlet. The inlet of the flow regulator is connected to the outlet of the reservoir. There is also a manifold that has a plurality of feed channels. Each feed channel has an outer end terminated at a connector and an inner end terminated at a common chamber. The flow regulator is connected to the manifold to provide water from the reservoir to the common chamber at a regulated rate. There is also at least one vent plug. Each vent plug has a head including a head channel through the head from an inlet to an exit at a bottom of the head. Each vent plug further includes an outer wall that extends from the bottom of the head. The outer wall defines an interior volume of the vent plug and there is a floor at a bottom of the outer wall. There is a vent hole formed through the floor. A bottom of the vent hole is positioned at an optimum fluid level height when the at least one vent plug is inserted into a vent opening of a battery. Each vent plug also has a column that includes a column channel that extends from the floor to the bottom of the head in the interior volume. A top of the column is positioned under the exit of the head channel. There is an opening defined between the top of the column and bottom of the head which fluidly connects the column channel to the interior volume. A bottom of the column channel extends below the bottom of the vent hole.

In accordance with a further feature, the flow regulator comprises a stem at a bottom of the reservoir, a boss extending from the stem and including a regulation chamber, a valve that is threadably engaged in the boss that regulates flow through the regulation chamber.

In accordance with a further feature, the flow regulator is connected in line between the reservoir and the manifold.

In accordance with a further feature, the manifold is planar and has a central feed point to a plurality of radial channels that extend outward from the central feed point.

In accordance with a further feature, the head channel includes a pinhole obstruction between the inlet and the outlet.

In accordance with some embodiments of the inventive disclosure, there is provided an automatic battery fluid maintenance system that includes a fluid reservoir having an outlet and a flow regulator having an inlet and an outlet. The inlet of the flow regulator is connected to the outlet of the reservoir. There is a manifold that has a plurality of feed channels, each feed channel has an outer end terminated at a connector and an inner end terminated at a common chamber. The flow regulator is connected to the manifold to provide water from the reservoir to the common chamber at a regulated rate. There is also at least one vent plug that is configured to fit into a vent opening of a battery. The vent plug having an inlet that is coupled to the manifold to receive water from the manifold, and wherein the vent plug is configured to create a backpressure that inhibits water from flowing into the battery when a fluid level of the battery is at an optimum level.

In accordance with a further feature, the vent plug includes a head having a head channel through the head from an inlet to an exit at a bottom of the head. The vent plug also includes an outer wall extending from a bottom of the head that defines an interior volume and having a floor at a bottom of the outer wall, a vent hole formed through the floor, wherein a bottom of the vent hole is positioned at an optimum fluid level height when the at least one vent plug is inserted into a vent opening of a battery. There is also a column having a column channel extending from the floor to the bottom of the head in the interior volume, a top of the column positioned under the exit of the head channel, an opening defined between the top of the column and bottom of the head which connects the column channel to the interior volume. The vent plug also includes a bottom of the column channel which extends below the bottom of the vent hole.

In accordance with a further feature, wherein there is a gap between a top of the column and a bottom of the head.

In accordance with a further feature, there is further a retaining ring formed around an outside of the outer wall.

In accordance with a further feature, the flow regulator comprises a stem at a bottom of the reservoir, a boss extending from the stem and including a regulation chamber, a valve that is threadably engaged in the boss that regulates flow through the regulation chamber.

In accordance with a further feature, the flow regulator is connected in line between the reservoir and the manifold.

In accordance with a further feature, the manifold is planar and has a central feed point to a plurality of radial channels that extend outward from the central feed point.

In accordance with a further feature, the head channel includes a pinhole obstruction between the inlet and the outlet.

In accordance with some embodiments of the inventive disclosure, there is provided an automatic battery watering system that includes a battery having a vent hole and a fluid level. There is a reservoir that has a volume which is filled with water or suitable aqueous battery fluid. There is a vent plug disposed in the vent hole of the battery. The vent plug has a head that has an inlet that is operably coupled to the reservoir such that water can flow from the reservoir to the inlet. The vent plug further has a body that includes an outer wall that extends from the head into the battery through the vent hole. There is an internal chamber defined within the body. The body has a floor which includes a vent opening therethrough. There is a channel that passes from the inlet to an outlet at a bottom of the head at the internal chamber, through the head. The floor is positioned at an optimum fluid level of the battery and when the fluid level of the battery is at the optimum fluid level a backpressure is created in the vent plug that inhibits the flow of fluid from the reservoir through the vent plug into the battery. When the fluid level of the battery is below the optimum level a lack of backpressure, due to the vent opening being exposed, allows flow of fluid into the battery through the vent plug from the reservoir.

In accordance with a further feature, the vent plug includes a head channel through the head from the inlet to an exit at the bottom of the head, a column having a column channel extending from the floor to the bottom of the head in the interior volume, a top of the column positioned under the exit of the head channel, an opening defined between the top of the column and bottom of the head which connects the column channel to the internal chamber defined by the outside wall, and a bottom of the column channel which extends below the bottom of the vent hole.

In accordance with a further feature, there is a gap between a top of the column and a bottom of the head.

In accordance with a further feature, there is further included a retaining ring formed around an outside of the outer wall.

In accordance with a further feature, the flow regulator comprises a stem at a bottom of the reservoir, a boss extending from the stem and including a regulation chamber, a valve that is threadably engaged in the boss that regulates flow through the regulation chamber.

In accordance with a further feature, the flow regulator is connected in line between the reservoir and the manifold.

In accordance with a further feature, the manifold is planar and has a central feed point to a plurality of radial channels that extend outward from the central feed point.

In accordance with some embodiments of the inventive disclosure, there is provided a vent plug for an automatic battery watering system that includes a head portion having a water inlet, and an internal volume bounded by a sidewall that extends downward from the head portion, and a floor at a bottom of the sidewall. There is also an extension that extends downward from the floor and has an opening to the internal volume. The floor includes an opening through the floor to the internal volume. The internal volume is sealed other than at the opening at the extension and the opening through the floor in order to create a backpressure in the internal volume when a fluid level of a battery covers the opening at the extension and the opening through the floor.

Although the invention is illustrated and described herein as embodied in an automatic watering system for a battery, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the article being referenced. Those skilled in the art can understand the specific meanings of the above-mentioned terms in the embodiments of the present invention according to the specific circumstances.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
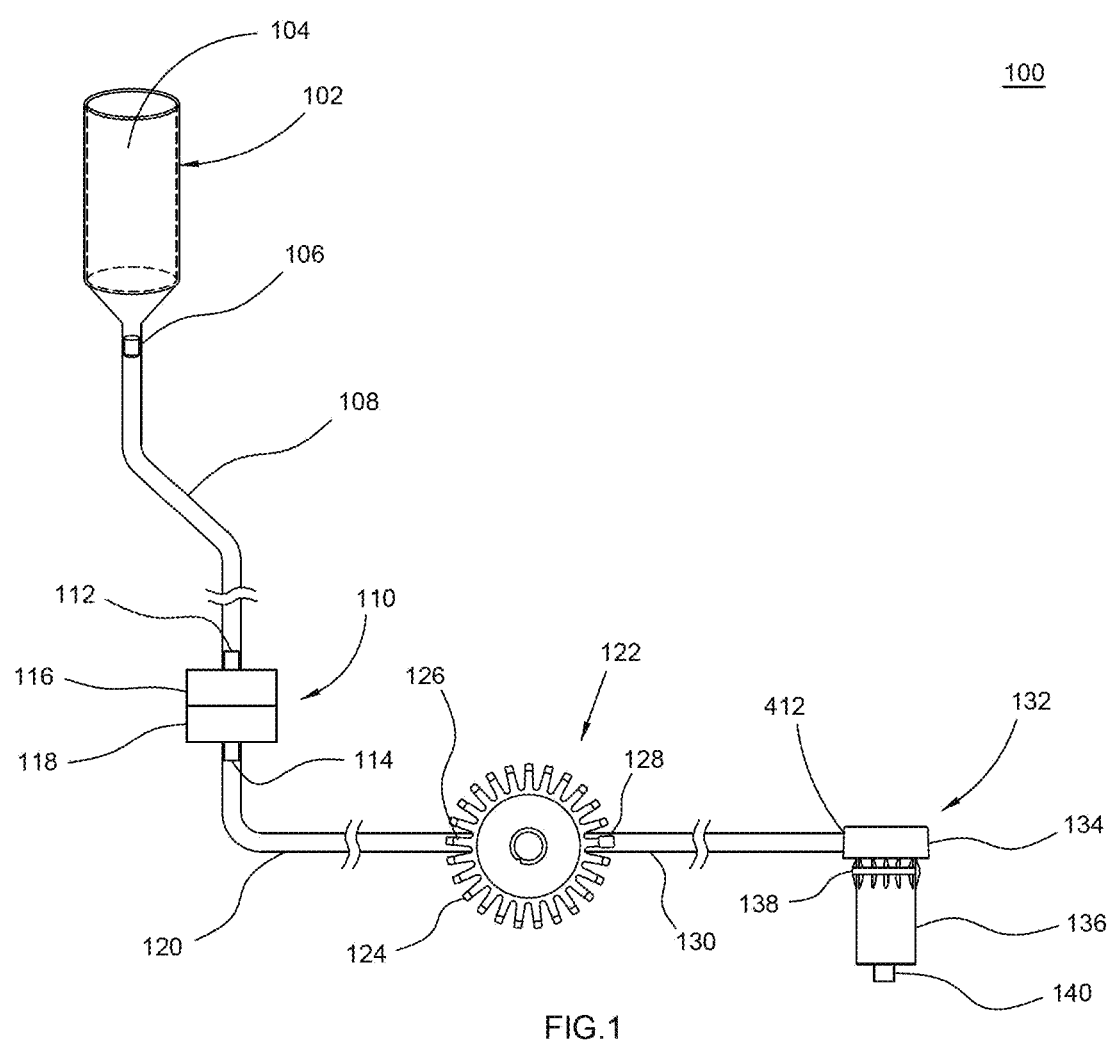
FIG. 1 shows an automatic battery watering system, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The invention of the disclosed embodiments provides a novel and efficient automated battery watering system. The inventive watering system is completely passive and avoids the use of float valves. Once the watering system is set up for a given battery assembly, it can travel with the battery assembly and continuously provide water/fluid to the battery while the battery assembly is in use, while it is being charged, and while it is offline being neither used or charged.

FIG. 1 shows an automatic battery watering system 100, in accordance with some embodiments. The system 100 provides for the watering of a one or more aqueous-based batteries, such as, for example, lead-acid batteries used for industrial equipment. As is known, for example, a forklift can be electrically powered using a lead-acid battery assembly, which includes several lead-acid batteries, each having a nominal voltage of about twelve volts. While in use, some of the batteries in the battery assembly will get warmer than surrounding batteries, simply due to their central location in the battery assembly. As a result, these batteries can lose water at a faster rate than batteries on the outside of the battery assembly. Thus, each battery in the battery assembly can have different replenishment requirements to maintain the battery at an optimal operating state.

Accordingly, the system 100 includes a fluid reservoir 102 that has a volume 104. In some embodiments the volume 104 can be on the order of one to two liters. Fluid can be periodically added to the volume 104 as it becomes depleted over time. At the bottom of the reservoir 102 is an outlet 106 that is configured to accept an end of a section of tubing 108 over it. That is, the tubing 108 fits over a short cylindrical structure, the outlet 106, as is well known. There is a channel through the outlet 106 that is fluidly connected to the volume 104 which allows fluid to pass from the volume 104 into the tubing 108.

The section of tubing 108 is connected, at an opposite end, to an inlet 112 of an adjustable flow regulator 110. The flow regulator 110 can be substantially similar to flow regulators used in the intravenous delivery of fluids to a patient in medical applications. There is a fixed portion 118 and a rotating portion 116 that can be rotated to select a flow rate. The flow regulator 110 has an outlet 114 that is connected to a second section of tubing 120, and the flow rate beyond the outlet 114 is constrained by a setting of the flow regulator 110. Being adjustable, the flow rate can be selected by a user/technician based on specific application parameters such as the number of batteries being watered.

The second section of tubing 120 is further connected to a manifold assembly 122 that is shown here on its side. The manifold assembly 122 has an inlet 126 and a plurality of outlets 124. The outlets 124 can be capped or connected to another tubing section such as third tubing section 130, which is connected to an outlet 124 at one end 128 and to a vent plug 132 at the opposite end. The manifold assembly 122 can include a common chamber to which each of a plurality of channels are connected, with each channel passing through a respective one of the outlets 124. Thus, the manifold assembly 122 is responsible for fluid distribution to each of one or more vent plugs 132. The vent plugs 132 each fit into the vent opening over a respective battery. Accordingly, certain portions of the vent plugs 132 are sized to fit into a vent opening of the battery and replace a vent cap that is provided with the battery. Each vent plug 132 can include a head 134, a body 136 includes an outside wall that depends from the head 134, and a retaining ring 138. In general, the body 136 is hollow within the outside wall, and there is a channel that extends from an opening at the inlet 412 to the volume inside the body 136 through the head 134. As will be shown and described in further detail, there is an insert 140 that includes a portion that resides inside the body 136, a portion that closes the bottom of the body 136, and a section that extends below the bottom of the of the body. The retaining ring 138 is a structure that creates an interference fit with the body of the battery in the vent opening so that the vent plug 132 can be inserted into the vent opening and retained therein, but also allow removal of the vent plug 132 from the vent opening. The internal structure of the vent plug 132 assists in regulation of water delivered to a battery in a way that maintain the fluid level of the battery at an optimum and consistent level without the use of floats or other mechanisms.

Thus, water flows from the reservoir 102 to each vent plug 132 as needed. A flow regular and manifold can be connected in line between the reservoir and the vent plug(s). By "in line" it is meant that fluid flows through the flow regulator and manifold from the reservoir to the vent plug(s).

Figure 2:
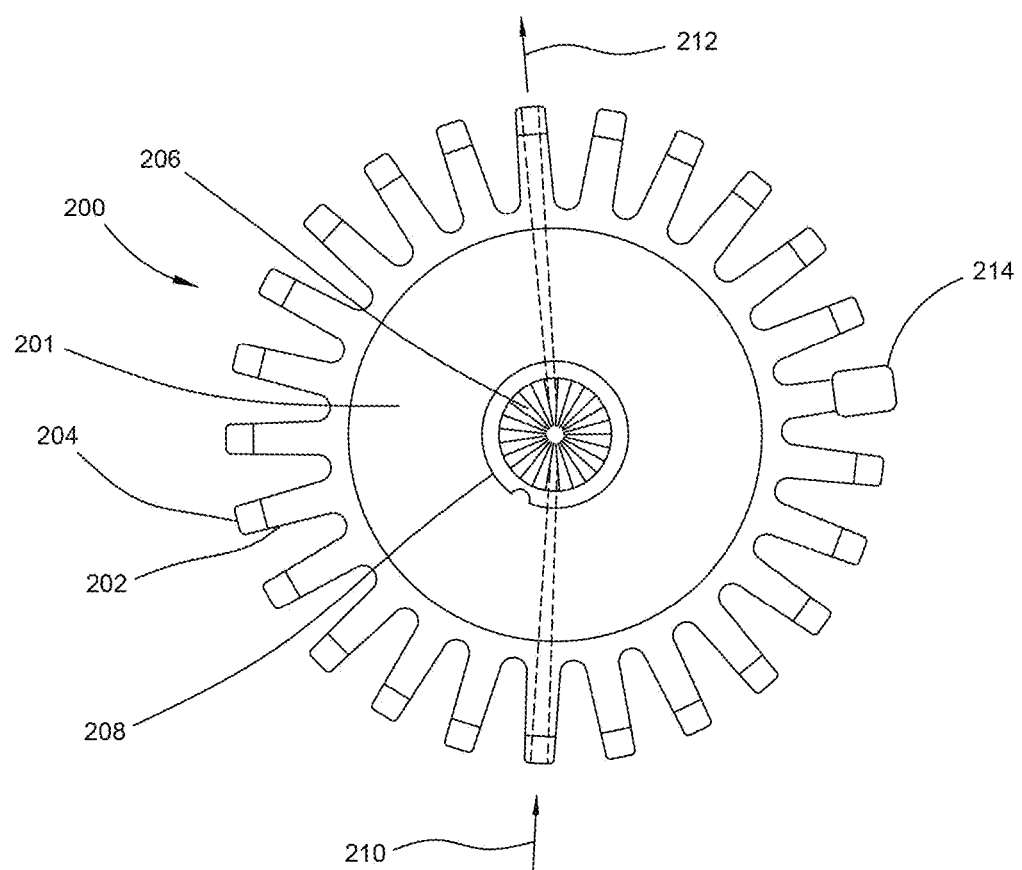
FIG. 2 shows a top plan view of a water manifold for distributing water to batteries in a battery watering system, in accordance with some embodiments.

FIG. 2 shows a top plan view of a water manifold 200 as part of a water manifold assembly 122 for distributing water to batteries in a battery watering system, in accordance with some embodiments. The manifold 200 includes a generally planar body 201 that is round or circular and flat/planar. Around the outside of the body 201 are a plurality of outlets 202 that extend radially outward like spokes. Each of the outlets has an outer end or tip 204 that can receive an end of a section of tubing or a cap 214. There is a feed channel or radial channel in each outlet 202 that extends from an opening at the tip 204 to a common chamber 206 that can be centrally located in the body and allows fluid to fill the common chamber 206 and pass through each channel that is open. The channels have an inner end at the common chamber 206 and can be tapered, getting narrower towards the common chamber 206. In some embodiments one of the outlets 202 can be used as an inlet to allow water into the common chamber, as indicated by arrow 210. Water flows out of the outlets 202 in the direction of arrow 212, for example, as needed by each battery, and as regulated by the vent plug in the respective battery. Alternatively, to using one of the outlets 202 as an inlet, the manifold 200 can have an attachment feature 208 that allows connection of an inlet structure that includes a tip to receive an end of a section of tubing like tip 204. The caps 214 fit snugly over the tip 204 of an outlet 202 and form a fluid seal to prevent egress of fluid at the respective outlet 202 on which the cap 214 is attached.

Figure 3:
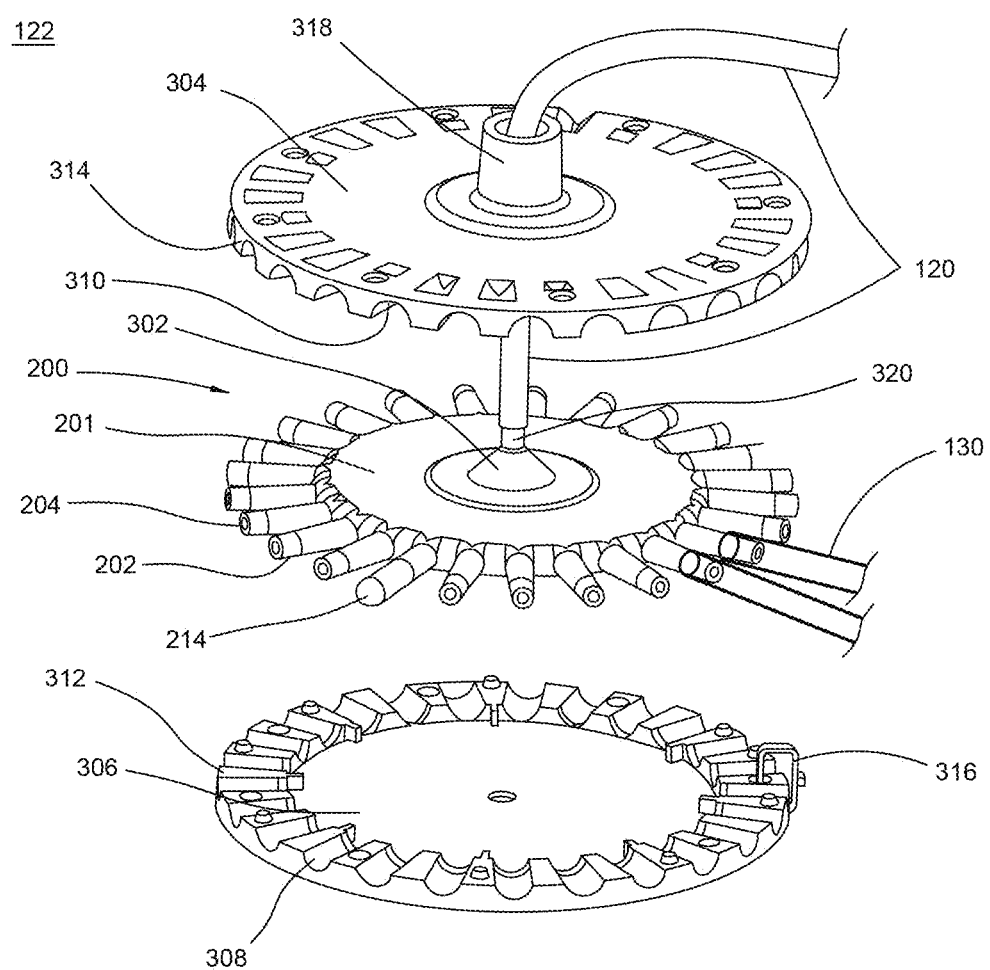
FIG. 3 is a perspective view of a water manifold with connections to batteries as a use example, in accordance with some embodiments.

FIG. 3 is a perspective view of a water manifold assembly 122 with connections to batteries as a use example, in accordance with some embodiments. The manifold assembly includes the water manifold 200 with the circular planar body 201 which distributes water radially to each of a plurality of tips 204. For example, a water supply line in the form of tubing section 120 can be connected to a coupler 302 at a central feed point that is attached at the attachment feature 208 to provide water from the tube section 120 to the common chamber 206. One of the outlets 202 can be coupled to tubing section 130, which is further attached to a vent plug 132. Other outlets 202 which are not being used to supply water to a battery vent cap, can be capped using a cap 214.

The manifold assembly 122 can further include a housing comprised of an upper housing portion 304 and a lower housing portion 306. The upper housing portion 304 is disposed over the manifold 200 at a top side of the manifold 200. The top side is the planar side to which the coupler is connected. The lower housing portion 306 is positioned under the manifold 200 opposite the upper housing portion 304. The upper and lower housing portions 304, 306 are likewise circular and planar, and encase the manifold 200, sandwiching the manifold 200 between the upper and lower housing portions 304, 306. Each of the housing portions 304, 306 have a plurality of radially oriented ridges 312, 314 that are separated by semi-cylindrical grooves 308, 310. The grooves 308, 310 are sized to allow the outlets 202 to extends along a cylindrical channel formed by the grooves 310, 312 when the housing portions 304, 306 are brought together, with room to further receive the end of a tubing section that is fit over the outlet 202. The ridges 312, 314 make contact and allow the housing portions 304, 306 to be joined together, such as by welding or by adhesive. Like the grooves 308, 310, the ridges 312, 314 extend to the outer edge in radial direction from the center of the respective housing portion 304, 306. However, they do not extend to the center, leaving room for the body 201 of the manifold 200. In some embodiments there can be openings through the ridge 312, 314 through which a fastener 316, such as a cable tie, screw, bolt, or other fastener can pass to hold the housing portions 304, 306 together, and/or hold the manifold assembly 122 to a mounting location. The upper housing portion 314 can include a feed boss 318 through which the feed tubing section 120 can pass to connect to the manifold 200. The feed boss protects the feed connector 320 that the feed tube 120 is connected to.

Figure 4:
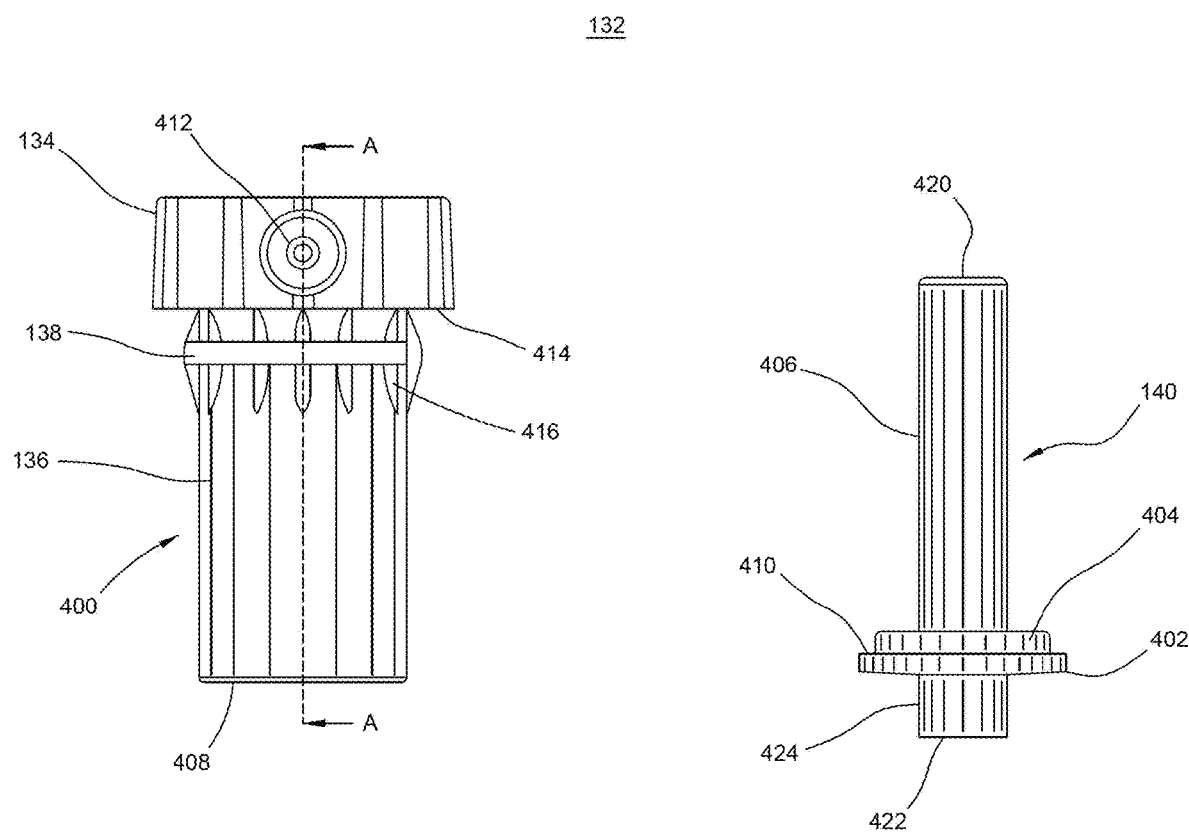
FIG. 4 shows an exploded view of a vent plug that is configured to replace a battery vent cap and provide water to the battery, in accordance with some embodiments.
Figure 5:
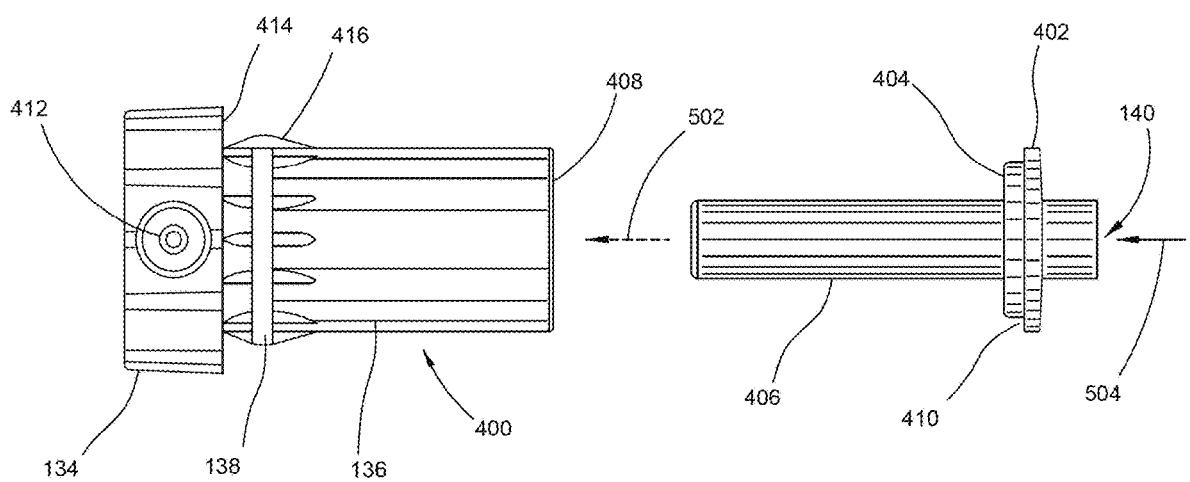
FIG. 5 shows an assembly view of a vent plug, in accordance with some embodiments.

FIG. 4 shows an exploded view of a vent plug that is configured to replace a battery vent cap and provide water to the battery, in accordance with some embodiments. The vent plug 132 is shown formed here in two parts, but any of a number of sub-assemblies could be realized within the spirit and scope of the disclosure. As shown here, the vent plug includes a plug section 400 and an insert section 140 which is inserted into the plug section as shown in FIG. 5. The plug section 400 includes a head 134, a body 136 having an outer wall that extends from a bottom 414 of the head 134. The body 136 has a bottom 408 that is open, and the outer wall that forms the body 136 defines a volume bounded by the outer wall and the bottom 414 of the head 134. The retaining ring 138 can include ramp portions 416 that allow for easier insertion and extraction of the vent plug from a vent opening in a battery. The retaining ring extends outward relative to the outer surface of the outer wall of the body 136. Thus, the body 136 has an outer diameter or size that allows it to pass through a battery vent opening, while the diameter of the retaining ring 138 is such that it comes into contact with the wall of the battery housing around the vent opening and creates friction that resists movement of the vent plug. This friction prevents the vent plug from coming loose or inadvertently coming out of the vent opening, but is not so tight as to prevent manual extraction of the vent plug from the vent opening.

The insert section 140 is intended to be inserted into the body 136 of the plug section 400, and includes a column 406 that is hollow and open at both the top 420 and bottom 422 of the column 406. There is a first annular disk portion 402 that forms a floor of the vent plug 132 around the column 406 that is configured to bear against and seal to the bottom 408 of the body 136. A second annular disk portion 404 is formed above the first annular disk portion 402 and around the column 406. The second annular disk portion does not extend outward from the column 406 as far as the first annular disk portion 404, creating a step 410. The second annular disk portion 404 has an outer diameter that is about the same as the inner diameter of the outer wall of the body 136 of the plug section 400. The column has a lower section 424 that extends below the annular disk portions 402, 404. When the insert section 140 is inserted into the body 136 of the plug section 400, the top 420 of the column 406 is spaced apart from the bottom of the head 134 inside the body 136. As shown in FIG. 5, by arrow 502, the insert section 140 is inserted into the plug section 400 such that a major portion of the column 406 is inside the body 136. The first and second annular disk portions 402, 404 can be thought of as one annular disk portion with a step 410 that allows one portion to be inside the body 136 of the plug section 400.

Figure 6:
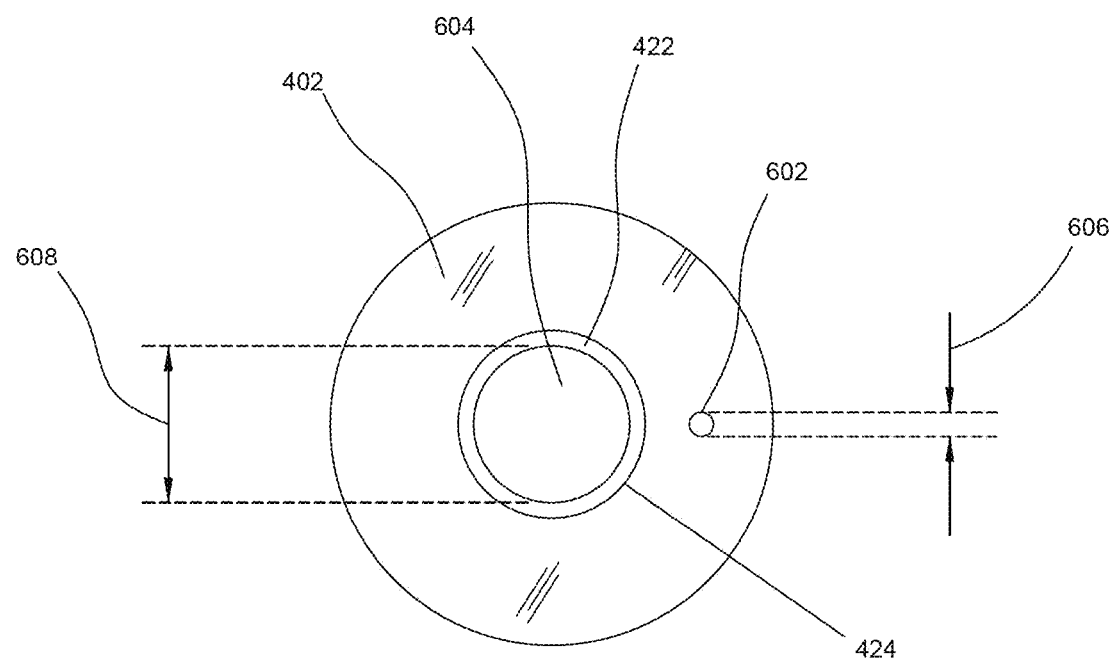
FIG. 6 shows a bottom view of a vent plug insert, in accordance with some embodiments.

FIG. 6 shows a bottom view of the insert section 140, looking in the direction of arrow 504 of FIG. 5. In view here are the bottom surface of the first annular disk portion 402, and the bottom 422 of the lower section 424 of the column 406. The bottom 422 of the column 406 defines an opening to a channel 604 through the column, which is open at the top as well. The channel 604 has a diameter 608 that can be on the order of 0.1 to 0.5 inches in some embodiments, or larger or smaller in other embodiments. There is also a smaller channel 602 through the annular disk portions that has a diameter of about 0.005 inches with a tolerance of ten percent.

Figure 7:
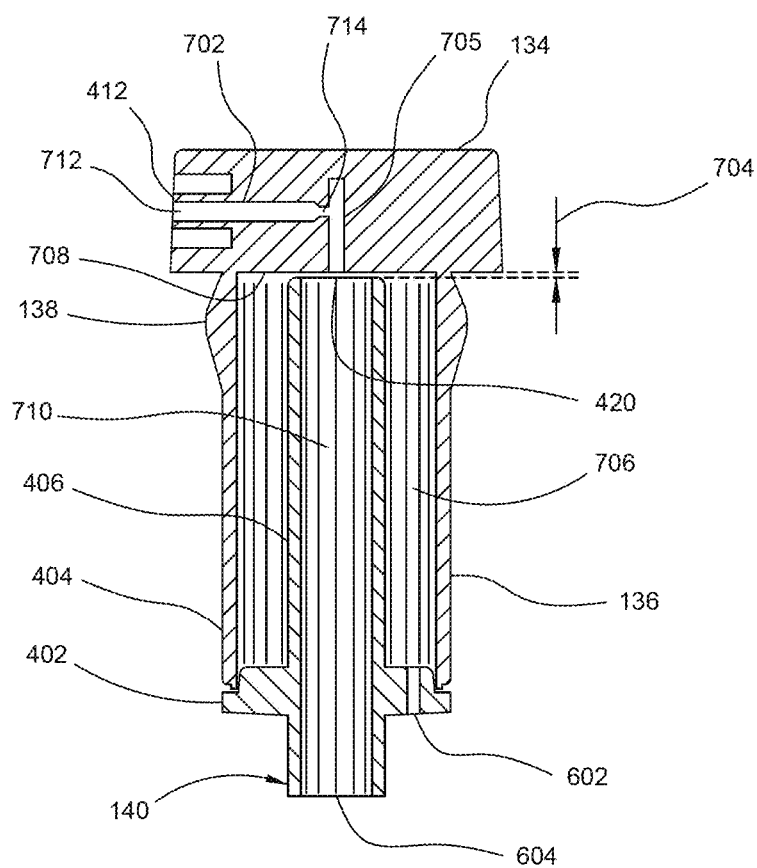
FIG. 7 shows a side cut-away view of a vent plug taken along line AA of FIG. 4, in accordance with some embodiments.

FIG. 7 shows a side cut-away view of a vent plug taken along section line AA of FIG. 4, in accordance with some embodiments. In this view it can be seen that there is a head channel comprised of a first channel 702 that leads from an opening 712 at the inlet 412 to a second channel 705 that has an exit that is an opening at the bottom 708 of head 134 inside the body 136. The opening of the second channel 705 at the bottom 708 of the head 134 is positioned over the opening at the top 420 of the column 406 of the insert section 140. There is a pinhole opening 714 from the first channel 702 to the second channel 705 which provides an obstruction that helps inhibit the flow of fluid in the presence of back pressure in the vent plug. Water passing through the first channel 702 to the second channel can into the channel 604 of the column 406 and into the fluid in the battery (assuming the vent plug is in a vent opening) in the absence of back pressure. There is a gap 704 between the top 420 of the column and the bottom 708 of the head in the body 136. The gap 704 can be on the order of 0.01 inches. As can be seen, there is an internal chamber or volume 706 around the column 406 inside the body 136, and there is a column chamber or column volume or column channel 710 inside the column 406 of the channel 604. These two volumes 706, 710 are connected through the gap 704. The chambers 706, 710 are volumes that are largely with air, except for the wall of column 406.

Figure 8A:
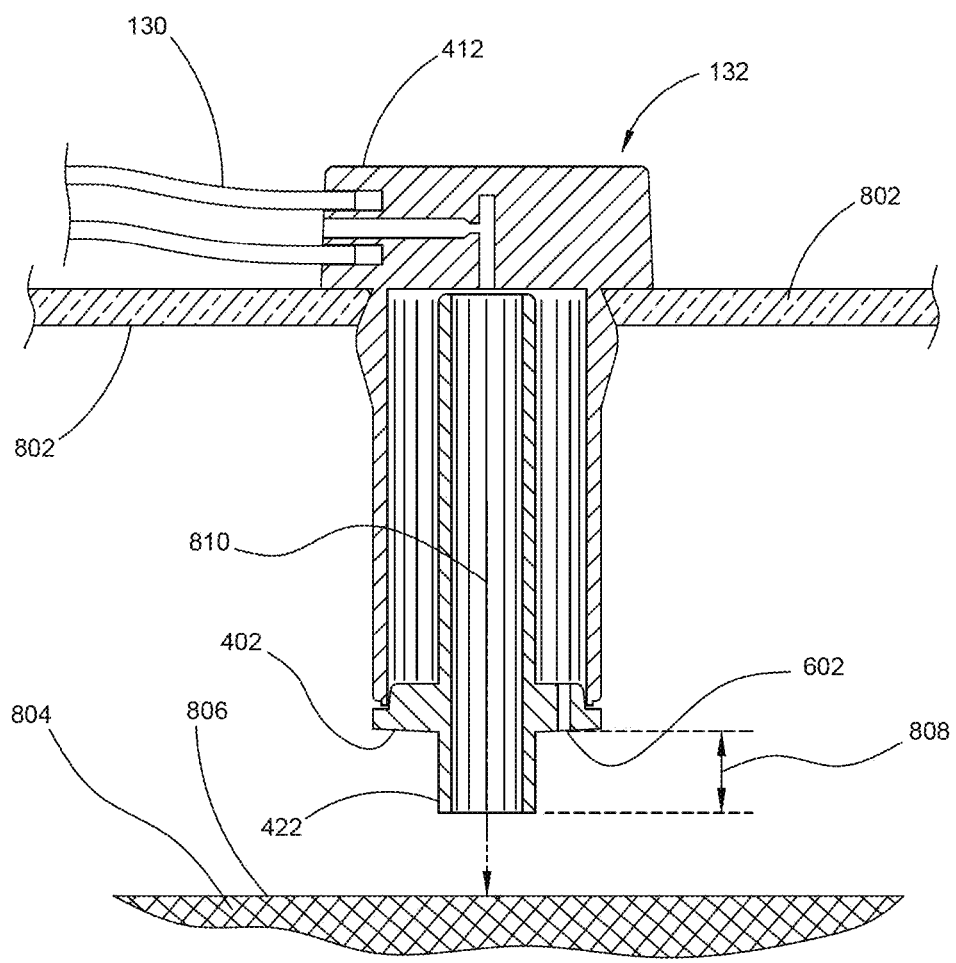
FIGS. 8A-8C each show a side cut-away view of the vent plug disposed in a battery as the fluid level in the battery rises, in accordance with some embodiments.
Figure 8B:
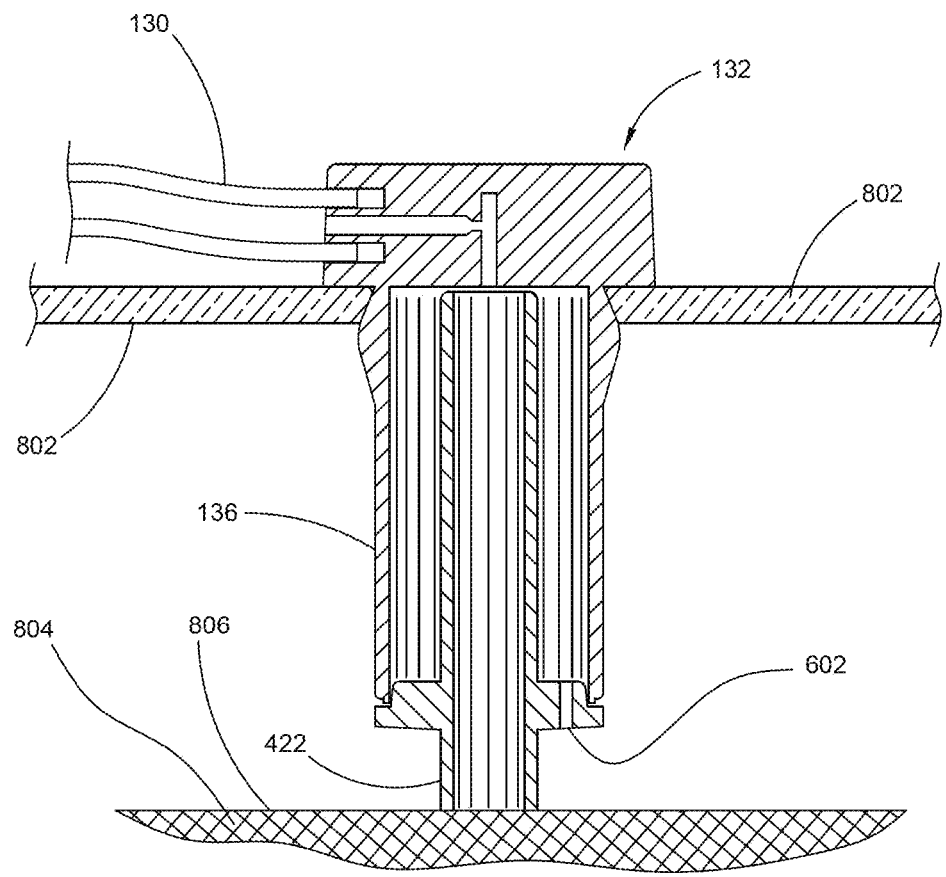
Figure 8C:
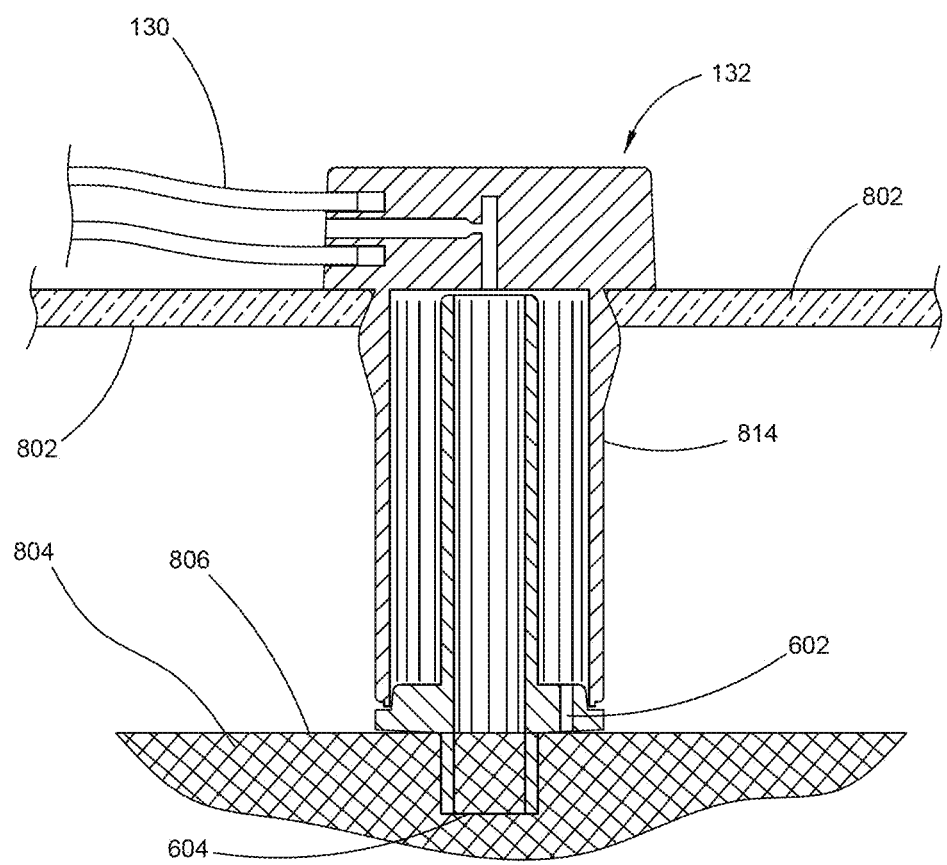

FIGS. 8A-8C each show a side cut-away view of a vent plug disposed in a battery as the fluid level in the battery rises, in accordance with some embodiments. In each of FIGS. 8A-8C there is a battery housing 802 which is the top of the battery. The vent plug 132 is positioned in a vent opening through the housing 802. There is a tubing section 130 connected to the inlet 412 to deliver water to the vent plug 132 from the manifold assembly 122. Inside the battery is a fluid 804 which can be the electrolyte that allows electrical flow between the plates of the battery. The fluid has a surface 806 which indicates the fluid level in the battery. In FIG. 8A, the fluid level is below the bottom 422 of the column of the insert portion, resulting in no back pressure inside the vent plug 132. As a result, water freely flows into the battery as indicated by arrow 810. It is also shown there that there is a height 808 at which the bottom of channel 602 is above the bottom 422 of the column. In FIG. 8B enough water has been provided to the fluid 804 to cause the fluid level to rise to the bottom 422 of the column. As a result, air or other gases inside the volume of the body 136 can escape through channel 602, but not at the bottom 422 of the column. At this point, the water flow through the plug slows down due to increased back pressure. In order for water to flow into the vent cap 132, it must displace air inside the vent plug 132. That is, air and gasses inside the body 136 must be pushed out of the body 136 in order for water to flow into the vent plug 132. In FIGS. 8A and 8B gasses can escape freely in FIG. 8A out through the bottom of the channel 604, and in FIG. 8B through channel 602. As a result, there is a lack of backpressure in the internal volume of the vent plug, and fluid can flow into the vent plug.

In FIG. 8C the fluid level has risen to cover the bottom of the channel 602, and thus there is nowhere for air/gas to escape, resulting in backpressure that inhibits water flowing through the vent plug. At this point water flowing into the vent plug stops and the fluid level of the battery fluid 804 is at an optimum level. Accordingly, the dimensions of the vent plug are such that the bottom of channel 602 is positioned at the height of the optimum fluid level for the battery. In experiments conducted using the dimensions of the channels 702, 602, the diameter of the tubing, the height of the reservoir over the battery, and the flow rate selected at the flow regulator were found such that the fluid levels of several batteries could be maintained independent of each other at optimum levels. Minimizing the inside diameter of the tubing used in the system prevents the collection of a mass of water in the tubing that can create a forward pressure that overcomes the back pressure created by channels 602, 602 being closed off by fluid in the battery. The tubing can have a nominal inner diameter of 0.125 inches in the sections shown herein. Other size tubing can be used, however, based on the application. It will be appreciated that the internal volume of the vent plug is sealed so that air/gasses can only escape through the bottom 604 of the extension of the insert, and through the opening 602. Once those are covered by the battery fluid level there is no way for air/gas inside the vent plug to escape, which creates back pressure that inhibits further water from entering the vent plug through the tubing.

Figure 9:
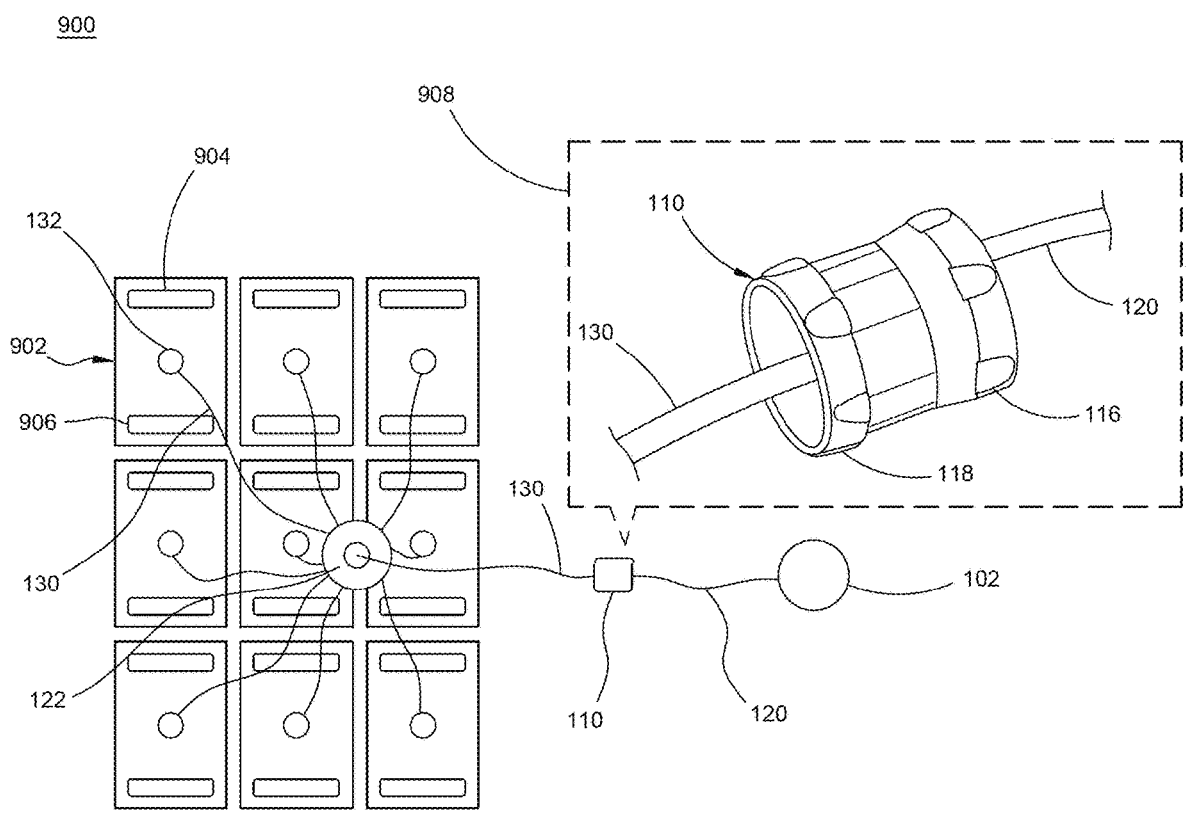
FIG. 9 shows a battery system using an automated battery watering system, in accordance with some embodiments.

FIG. 9 shows a battery assembly 900 using an automated battery watering system, in accordance with some embodiments. There is a reservoir 102 that is fluidically coupled to a flow regulator 110 through a first section of tubing 120. The flow regulator 110 is fluidically coupled to a manifold assembly 122 by a second section of tubing 130. The call-out 908 shows the flow regulator 110 in more detail. There are nine batteries 902 shown, each battery having electrodes 904, 906. A vent plug 132 is shown inserted into the vent opening of each battery, and each vent plug 132 is fluidically coupled to the manifold through a section of tubing 130. The nine batteries 902 form the battery assembly 900 which can be used to power, for example, a forklift.

Figure 10:
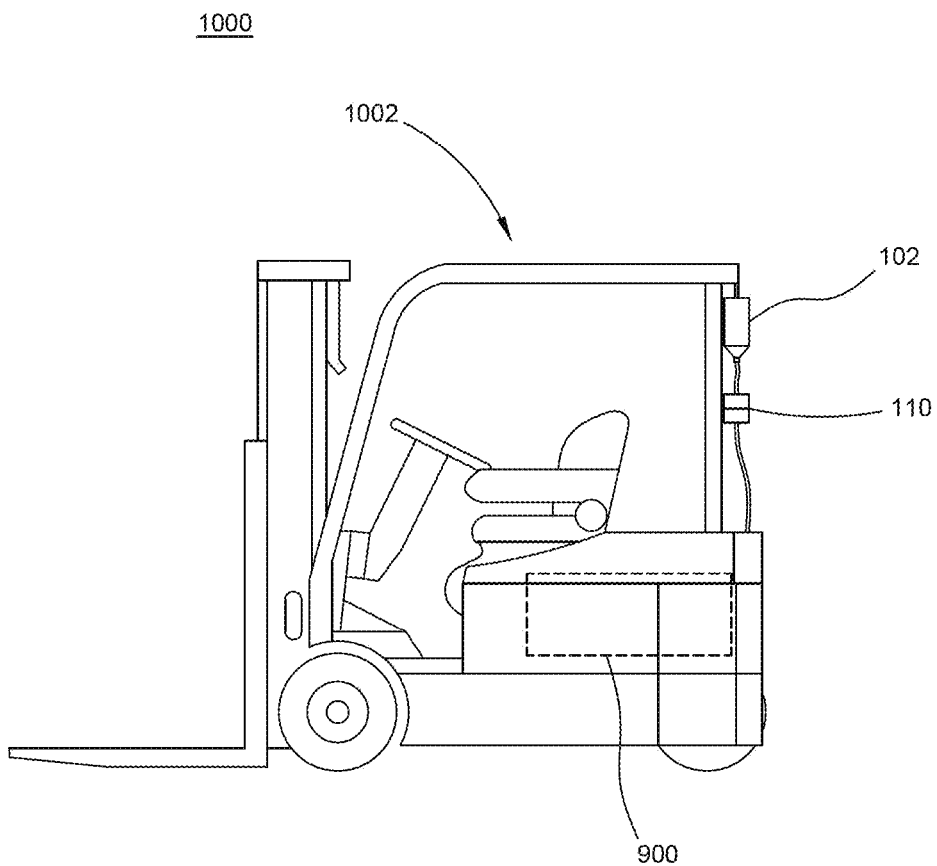
FIG. 10 shows use of an automated battery watering system with a battery of a forklift, in accordance with some embodiments.

FIG. 10 show use 1000 of an automated battery watering system with a battery assembly 900 of a forklift 1002, in accordance with some embodiments. The forklift 1002 includes a space where the battery assembly 900 is housed and connected to the controls and motors of the forklift 1002. A reservoir 102 can be hung on the forklift above the flow regulator 110, and both of which are above the battery assembly 900. The battery assembly 900 can be removed from the forklift for charging, and a different battery assembly can be placed in the forklift for continued operation of the forklift. When the battery assembly is removed, the reservoir 102, flow regulator 110, tubing, and manifold all travel with the battery assembly, and maintain the fluid levels of each battery in the battery assembly while the battery assembly is being charged, as well as when the battery assembly is finished charging and in queue to be placed into another forklift.

Figure 11:
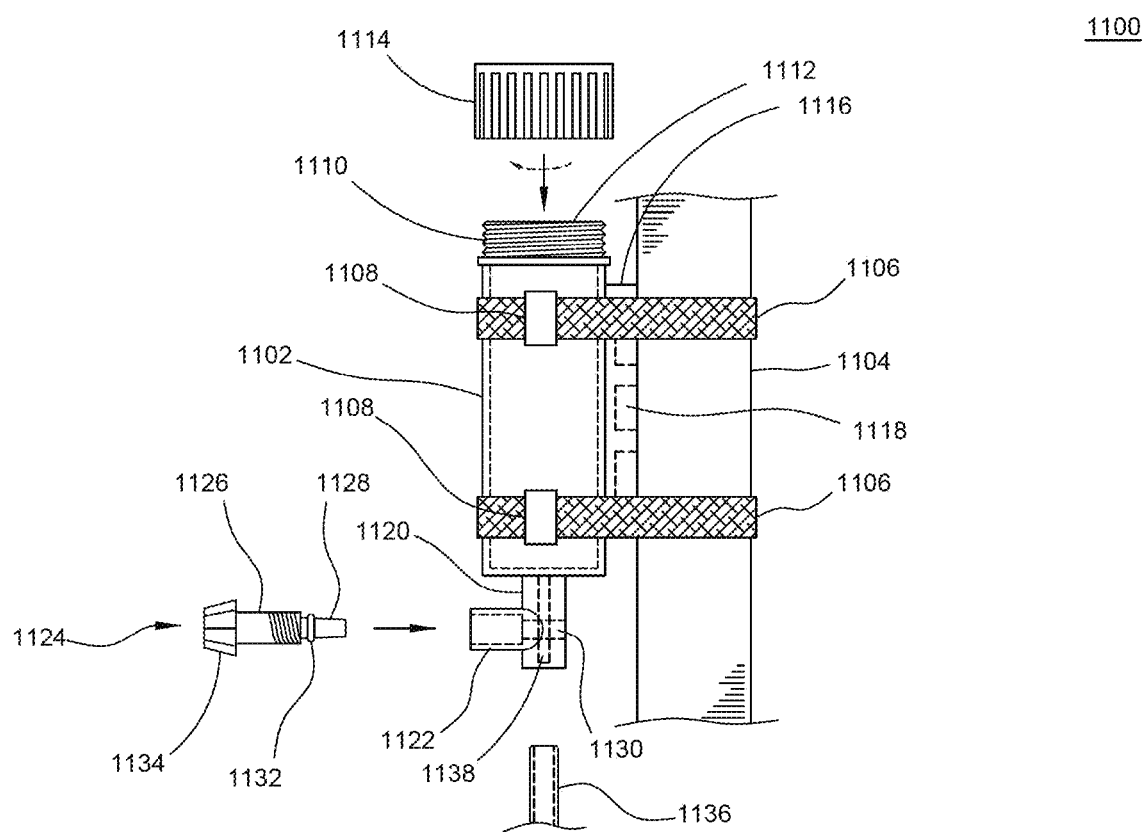
FIG. 11 shows an elevational side view of an installed reservoir for use in an automated battery watering system, in accordance with some embodiments of the invention.

FIG. 11 shows an elevational side view of an installed reservoir 1102 for use in an automated battery watering system 1100, in accordance with some embodiments of the invention. The reservoir 1102 is shown mounted on a steel pillar 1104, such as a pillar of a forklift around the operator's compartment. A pair of straps 1106 can pass round the pillar 1104 and the reservoir 1102, through loops 1108 on the side of the reservoir 1102, to hold the reservoir 1102 in place. Further, the reservoir 1102 can includes magnet holder 1116 that holds one or more magnets 1118 that are fixed to the magnet holder 1116. The magnets 1118 can produce a magnetic attractive force to the pillar 1104 that is strong enough to hold the reservoir 1102 in place and the straps 1106 are used to ensure the reservoir 1102 stays in place on the pillar 1104 in the event of an inadvertent impact or such.

The reservoir 1102 has an internal volume for holding a volume of fluid that is dispensed to batteries in order to keep the fluid level of the batteries at an optimum operating level. A top 1110 of the reservoir 1102 can be threaded to receive a cap 1114 to contain the fluid in the reservoir 1102 and to allow for periodic replenishment of the fluid. At the bottom of the reservoir 1102 there is a stem 1120 that extends downward and houses a flow regulator than can replace an in-line flow regulator such as flow regulator 110. There is a channel through the stem 1120 that is fluidly coupled to the volume of the reservoir 1102. A regulation chamber 1130 is formed in the stem 1120 in correspondence with a boss 1122 which extends horizontally. The boss 1122 is configured to receive and hold a regulator valve 1124 which threads into the boss 1122. Once positioned in the boss 1122, the valve 1124 can be turned to a desired position to adjust the flow of fluid through the stem 1120 to a tube 1136, which fits over outlet 1138, that is coupled to a distribution manifold assembly (e.g., 122). The valve 1124 has a tapered portion 1128 coupled to a threaded shaft 1126. The threads on the threaded shaft fit into thread on the inside of the boss 1122. A knob 1134 assists in turning the valve 1124 to the desired position. The tapered portion is separated from the threaded shaft 1126 by a seal 1132. The regulation chamber 1130 can have a shape that is the same as the tapered portion 1128. If the valve 1124 is turned to fully insert the threaded portion 1128 into the regulation chamber, then the threaded portion will contact the wall of the regulation chamber 1130 and prevent the flow of fluid into the tube 1136. By turning the knob 1134 to back the tapered portion 1128 out from the regulation chamber 1130 there is increasing space, and hence increasing flow of fluid past the tapered portion 1128 from the reservoir 1102 into the tube 1136.

Figure 12:
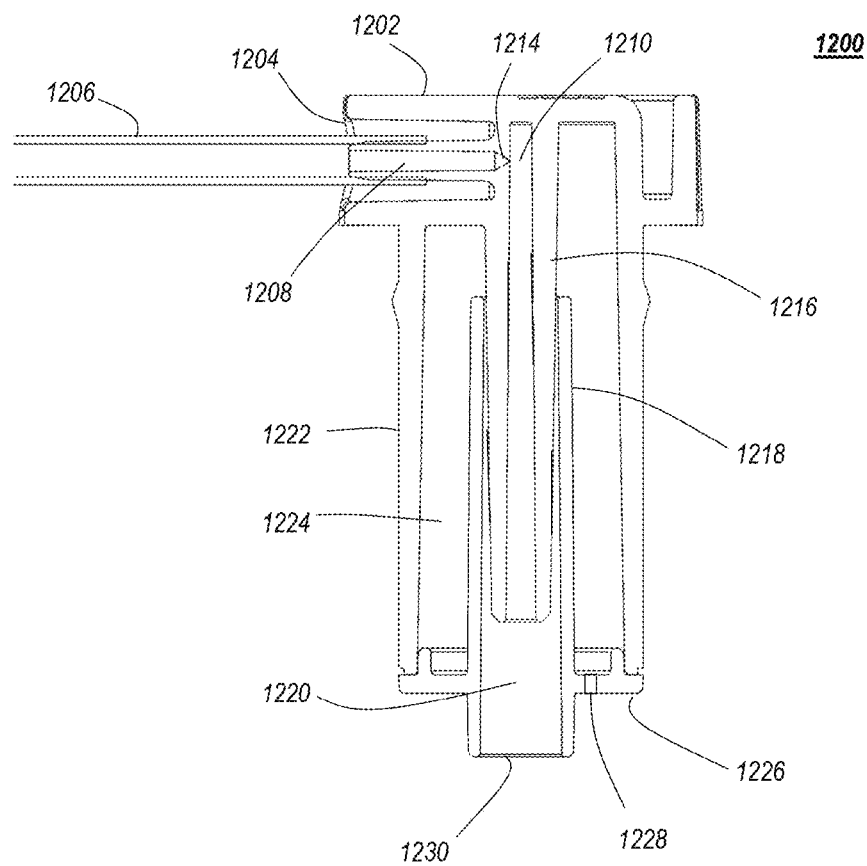
FIG. 12 shows a side cut-away view of a vent plug with the section taken centrally along a vertical plane, in accordance with some embodiments.

FIG. 12 shows a side cut-away view of a vent plug 1200, with the section view taken centrally along a vertical plane, in accordance with some embodiments. The vent plug 1200 is similar to that of FIGS. 7-8C but includes in internal stem 1216 that extends downward from the head 1202 inside the volume 1224 inside the outer wall 1222. The stem 1216 fits inside the internal space 1220 of the column 1212 of the insert. There is a small gap on the order of thousands of an inch (e.g., 0.001"-0.010"+/−50%) between the inner surface of the column 1218 and the outer surface of the stem 1216. This allows air to pass between the stem 1216 and the column 1218.

In the head 1202 there is an inlet 1204 configured to receive the end of tubing section 1206 through which water is provided to the vent plug 1200 from the manifold. A horizontal channel 1208 in the inlet section connects to a vertical channel 1210 that continues from the head portion to the stem 1216. The horizontal channel narrows to an opening 1214 between the horizontal channel 1208 and the vertical channel 1210. The opening 1214 can have a diameter on the order of 0.010 inches with a tolerance of ten percent in some embodiments, although the opening 1214 can be larger or smaller. At the bottom of the insert is a floor 1226 that meets the bottom of the outer wall 1222, and which can be joined to the bottom of the outer wall such as by welding. An opening 1228 passes though the floor 1226 (which is an annular disk portion). The opening 1228 can have a diameter of about 0.005 inches, with a tolerance of ten percent. An extension 1230 of the insert extends down from the floor 1226.

Accordingly, the inventive automated battery watering system provides the benefits of simplicity while avoiding the problems associated with the prior art. Because the system doesn't use a "daisy chain" arrangement, each of the batteries are independently maintained. By avoiding the use of float valves, the batteries are not overwatered due to vibrations that allow water to flow past the float. There are no moving parts in the system that can fail. Once the system is set up and calibrated for the particular application, as long as the reservoir is suitably replenished, the batteries are maintained at their optimum fluid level. The system carefully controls the diameter or dimensions of the watering system including the water passages and the air escape openings to control the back pressure in the system relative to the fluid level in the battery. When the battery fluid level is low, there is very little to no back pressure as the extension at the bottom of the insert of the vent plug is open to air. When the fluid level rises to cover the bottom of the extension, then air escape is limited to the opening through the disk portion/floor of the insert. Once the fluid level rises to cover that opening, then there is no path for air to escape from the inside of the vent plug.

The claims appended hereto are meant to cover all modifications and changes within the scope and spirit of the present invention.

What is claimed is:

1. An automatic watering system for a battery, comprising:
    a fluid reservoir having an outlet;
    a flow regulator having an inlet and an outlet, the inlet of the flow regulator being connected to the outlet of the reservoir;
    a manifold having a plurality of feed channels, each feed channel having an outer end terminated at a connector and an inner end terminated at a common chamber, the flow regulator being connected to the manifold to provide water from the reservoir to the common chamber at a regulated rate;
    at least one vent plug having:
        a head having a head channel through the head from an inlet to an exit at a bottom of the head;
        an outer wall extending from a bottom of the head that defines an interior volume and having a floor at a bottom of the outer wall, a vent hole formed through the floor, wherein a bottom of the vent hole is positioned at an optimum fluid level height when the at least one vent plug is inserted into a vent opening of a battery;
        a column having a column channel extending from the floor to the bottom of the head in the interior volume, a top of the column positioned under the exit of the head channel, an opening defined between the top of the column and bottom of the head which connects the column channel to the interior volume; and
        a bottom of the column channel which extends below the bottom of the vent hole.

2. The automatic watering system of claim 1, wherein the flow regulator comprises a stem at a bottom of the reservoir, a boss extending from the stem and including a regulation chamber, a valve that is threadably engaged in the boss that regulates flow through the regulation chamber.

3. The automatic watering system of claim 1, wherein the flow regulator is connected in line between the reservoir and the manifold.

4. The automatic watering system of claim 1, wherein the manifold is planar and has a central feed point to a plurality of radial channels that extend outward from the central feed point.

5. The automatic watering system of claim 1, wherein the head channel includes a pinhole obstruction between the inlet and the outlet.

6. An automatic battery fluid maintenance system, comprising:
    a fluid reservoir having an outlet;
    a flow regulator having an inlet and an outlet, the inlet of the flow regulator being connected to the outlet of the reservoir;
    a manifold having a plurality of feed channels, each feed channel having an outer end terminated at a connector and an inner end terminated at a common chamber, the flow regulator being connected to the manifold to provide water from the reservoir to the common chamber at a regulated rate; and
    at least one vent plug that is configured to fit into a vent opening of a battery, the vent plug having an inlet that is coupled to the manifold to receive water from the manifold, and wherein the vent plug is configured to create a backpressure that inhibits water from flowing into the battery when a fluid level of the battery is at an optimum level, the vent plug further having a head that has a head channel through the head from an inlet to an exit at a bottom of the head, an outer wall extending downward from the bottom of the head and defines an interior volume within the outer wall, a floor at a bottom of the outer wall that defines a bottom of the interior volume and which has a vent hole formed therethrough to the interior volume, a column having a column channel extending from the floor to the bottom of the head in the interior volume, a top of the column being positioned under the exit of the head channel at the bottom of the head, an opening defined between the top of the column and the bottom of the head which connects the column channel to the interior volume, the column channel extends through the floor and below a bottom of the vent hole through the floor.

7. The automatic battery fluid maintenance system of claim 6, wherein there is a gap between a top of the column and a bottom of the head.

8. The automatic battery fluid maintenance system of claim 6, further comprising a retaining ring formed around an outside of the outer wall.

9. The automatic battery fluid maintenance system of claim 6, wherein the flow regulator comprises a stem at a bottom of the reservoir, a boss extending from the stem and including a regulation chamber, a valve that is threadably engaged in the boss that regulates flow through the regulation chamber.

10. The automatic battery fluid maintenance system of claim 6, wherein the flow regulator is connected in line between the reservoir and the manifold.

11. The automatic battery fluid maintenance system of claim 6, wherein the manifold is planar and has a central feed point to a plurality of radial channels that extend outward from the central feed point.

12. The automatic battery fluid maintenance system of claim 6, wherein the head channel includes a pinhole obstruction between the inlet and the outlet.

13. An automatic battery watering system, comprising:
    a battery having a vent opening and a fluid level;
    a reservoir having a volume;
    a vent plug disposed in the vent opening, the vent plug having a head that has an inlet that is operably coupled to the reservoir such that water can flow from the reservoir to the inlet, the vent plug further having a body that includes an outer wall that extends from the head into the battery through the vent opening, an internal chamber defined within the body, the body having a floor which has a vent hole therethrough, a head channel passes from the inlet to an outlet at a bottom of the head at the internal chamber, a column having a column channel extending from the floor to the bottom of the head in the internal chamber, a top of the column positioned under the outlet of the head channel, an opening defined between the top of the column and the bottom of the head which connects the column channel to the internal chamber defined by the outside wall, wherein the column and the column channel extend through the floor and a bottom of the column and the column channel is below a bottom of the vent hole through the floor; and wherein the floor is positioned at an optimum fluid level of the battery and when the fluid level of the battery is at the optimum fluid level a backpressure is created in the vent plug that inhibits a flow of fluid from the reservoir through the vent plug into the battery, and when the fluid level of the battery is below the optimum level a lack of backpressure due to the vent hole being exposed allows flow of fluid into the battery through the vent plug from the reservoir.

14. The automatic battery watering system of claim 13, wherein there is a gap between a top of the column and a bottom of the head.

15. The automatic battery watering system of claim 13, further comprising a retaining ring formed around an outside of the outer wall.

16. The automatic battery watering system of claim 13, further comprising a flow regulator coupled operably coupled between the reservoir and the vent plug.

17. The automatic battery watering system of claim 16, further comprising a manifold operably coupled between the flow regulator and the vent plug.

18. The automatic battery watering system of claim 17, wherein the manifold is planar and has a central feed point to a plurality of radial channels that extend outward from the central feed point.

\* \* \* \* \*